March 6, 1951  A. S. NEWTON ET AL  2,544,277
PREPARATION OF URANIUM NITRIDE
Filed June 12, 1945
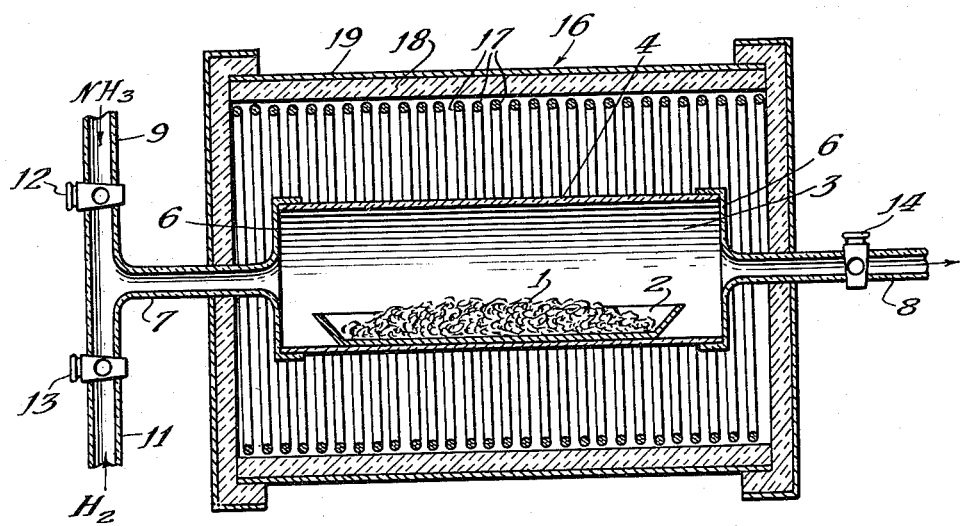
Witnesses:
Herbert E. Metcalf
John A. McElroy
Inventors:
Amos S. Newton
Oliver Johnson
By: Robert A. _____
Attorney Patented Mar. 6, 1951

2,544,277

UNITED STATES PATENT OFFICE 2,544,277

PREPARATION OF URANIUM NITRIDE

Amos S. Newton and Oliver Johnson, Ames, Iowa, assignors to the United States of America as represented by the United States Atomic Energy Commission Application June 12, 1945, Serial No. 599,067

2 Claims. (Cl. 23—14.5)

The invention relates to the preparation of a uranium nitride.

It is an object of the invention to provide a uranium nitride by the reaction of uranium either in compound form or as a metal with ammonia or nitrogen.

It is a more specific object of the invention to provide a process for obtaining a pure product in which the uranium is prepared in reactable form in situ and subsequently reacted with ammonia or nitrogen to form a uranium nitride.

Further objects and advantages will appear from the following description and the drawing referred to therein.

The drawing is a diagrammatic view in section of an apparatus which may be used in carrying out the invention.

The invention resides in the preparation of a uranium nitride by the reaction of uranium metal or uranium hydride with ammonia or nitrogen preferably at relatively low temperatures, such as from 200° C. to 400° C. When uranium hydride is used it may be advantageous to prepare such compound in situ, that is, in the same operation and apparatus in which the uranium hydride is subsequently reacted with the ammonia or nitrogen to produce the desired uranium nitride.

The product provided by the invention has been shown by analyses on the basis of weight gain to have a formula corresponding approximately to $UN_{1.5}$ to $UN_{1.75}$ which on calcination at about 1400° C. loses nitrogen to the extent that the composition of the nitride becomes 13.3 grams of nitrogen per 238 grams of uranium instead of the expected 14.0 grams of nitrogen corresponding to the molecular formula UN.

A suitable apparatus for carrying out the invention is shown in the drawing in which uranium 1 is contained in a shallow receptacle 2 adapted to be inserted in reaction chamber 3. The reaction chamber is formed by reactor 4 which may be of cylindrical form with one end 6 terminating in inlet tube 7 and the other end 6 terminating in exhaust tube 8. Tubes 9 and 11 lead into inlet tube 7 and, with exhaust tube 8, are provided with means for opening and closing the tubes such as stopcocks 12, 13, and 14. Reactor 4 is surrounded by heating means such as a conventional resistance furnace 16 in which resistance wires 17 are placed inside of insulation 18 and casing 19. Inlet tubes 9 and 11 are attached to a source of ammonia, hydrogen, or other gaseous reactant to be used in the process. Exhaust tube 8 leads to any suitable means for disposing of waste products exhausted during the process. The apparatus is formed of a material which is resistant to the high temperatures and corrosion resulting from the process. Heat resistant glass is suitable for this purpose.

The process may be carried out by preparing the uranium in reactable form in situ and then reacting the uranium with ammonia to obtain the desired uranium nitride. In such preparation of uranium, it is preferred that the uranium be converted to uranium hydride by passing hydrogen over uranium metal at a temperature of between 200° C. and 400° C. The uranium hydride is then reacted with ammonia in the same apparatus.

In this embodiment of the invention, the uranium metal is cleaned with an acid, such as, for example, $6N HNO_3$, to remove surface impurities such as uranium oxides, uranium carbides, or the like, washed free of acid and then dried prior to reaction with ammonia. Where the uranium metal is not clean, the impurities remain in the reaction chamber and contaminate the final uranium nitride product. The clean uranium 1, in the form of lumps, turnings, or the like, is placed in receptacle 2 and the dish inserted in reaction chamber 3. After assembling the apparatus, stopcock 12 is closed and stopcock 14 is opened. Hydrogen is then introduced into the reaction chamber through inlet tubes 11 and 7 by opening stopcock 13. Sufficient hydrogen is introduced into the system to completely flush out the reaction chamber. If desired, the reaction chamber may be prepared by being evacuated through exhaust tube 8 with stopcocks 12 and 13 closed and subsequently admitting hydrogen.

After the air in the reaction chamber has been replaced by hydrogen, tube 11 is closed by stopcock 13 and furnace 16 is placed into operation to heat the uranium metal to a temperature of between 200° C. and 400° C. Preferably, the temperature of the uranium is brought to approximately 250° C. Stopcocks 13 and 14 are then opened and hydrogen introduced into the reaction chamber 3 at substantially atmospheric pressure, the hydrogen reacting with the uranium metal to form uranium hydride. While there is a tendency for the hydrogen to lower the temperature of the uranium, the reaction is exothermic approximately 30,000 calories per mol of uranium hydride being released to aid in maintaining the temperature of the uranium. Preferably, an excess of between 20 per cent and 40 per cent of hydrogen is used, the excess passing out of the reaction chamber through exhaust tube 8.

If it is preferred not to use an excess of hydrogen, the reaction may be carried out by introducing the hydrogen into the reaction chamber with stop cock 14 closed. A slight hydrogen pressure from between one and three pounds is built up in the system and only an equivalent amount of hydrogen is used to form the uranium hydride.

As the reaction proceeds, the uranium hydride is formed as a powder on the uranium metal. If uranium is in the form of a metallic mass, the uranium hydride tends to slough off as it is formed thereby exposing additional metal for the reaction. This continues until substantially all of the uranium is converted to uranium hydride.

After the uranium has been converted to uranium hydride, the hydrogen inlet is closed by stopcock 13 and ammonia or nitrogen is admitted through inlet tube 9 by opening stopcock 12. Preferably, a substantial excess of either of these gases is used during the reaction to insure conversion of all the uranium to the nitride. During the introduction of the ammonia or nitrogen, it is preferred that stopcock 14 is open so that these gases will sweep out any hydrogen remaining in the reaction chamber or given off by decomposition of the uranium hydride during the nitriding reaction.

The temperature of the uranium hydride and of the reaction chamber during the introduction of the ammonia or nitrogen and its reaction with said hydride is maintained between 200° C. and 400° C. by resistance furnace 16. A major portion of the uranium nitride is formed at a temperature between 250° C. and 300° C. A portion of the uranium hydride may tend to decompose at this temperature into uranium metal and hydrogen, with the liberated hydrogen being swept out of the reaction chamber by the ammonia. The uranium metal resulting from the decomposition is in a pure, finely divided state and is extremely reactive and, if formed, reacts to form uranium nitride at 200° C. to 400° C. or above.

The temperature of the reaction chamber is maintained between 200° C. and 350° C. for from 2 to 3 hours to insure completion of the reaction. After the reaction is completed furnace 16 is shut off, the apparatus cooled to room temperature and disassembled, and the reaction product removed.

The above described process may be suitably carried out by eliminating the preliminary step of converting uranium metal to uranium hydride. Thus, prepared uranium hydride may be placed in receptacle 2 and ammonia passed through the reaction chamber while maintaining the temperature of the uranium hydride between 200° C. and 400° C. When the process is carried out in this manner, the presence of impurities, such as uranium oxide or the like, may increase the time required for the reaction and may decrease the yield. Such impurities are not normally present, however, where the uranium hydride is prepared in situ from clean uranium metal.

The uranium nitride may be obtained in accordance with the invention by directly reacting uranium metal with ammonia or nitrogen. The uranium metal is cleaned with an acid, such as 6N $HNO_3$ to remove surface impurities. After placing the metal in reaction chamber 3 with furnace 16 in operation, ammonia is passed through the reaction chamber with stopcock 13 closed and stopcock 14 open. As the temperature of the uranium increases to the most favorable temperature for the reaction, that is, between 200° C. to 400° C., the ammonia reacts with the uranium metal to form the uranium nitride. As it is formed, the nitride tends to coat the uranium metal thereby retarding further reaction by preventing contact between the metal and the ammonia. The yield may be increased by agitating the uranium metal with suitable means to remove the formed nitride and thereby expose a surface of fresh uranium metal to ammonia or nitrogen for further reaction and formation of said nitride.

In one specific example of the process, 9.35 grams of uranium hydride was placed in the bottom of reaction chamber 3. The uranium hydride was heated for 2 hours and 15 minutes at 250° C., and a substantial excess of ammonia was introduced into the reaction chamber during the heating. Thereafter the furnace was shut off, the apparatus cooled and disassembled, and approximately 9.9 grams of uranium nitride, $UN_{1.55}$, were removed. On heating the product thus obtained at about 1400° C. for one hour a nitride having the composition UN was secured. Uranium mononitride, formed by the process of this invention, is a steel-gray powder which is exceedingly fine and has a bulk density of 3.4 g./cc. The absolute density of the product, determined by immersion in hexane is 11.3 g./cc. The resistivity of the powder measured without compression is about 200 ohm-cm. compared with 0.47 ohm-cm. for the hydride and $10^8$ ohm-cm. for the oxides. The composition UN is suitably identified by means of its distinctive crystal lattice which is shown by X-ray diffraction to have a sodium chloride type structure and is a face-centered cubic phase containing 4 uranium atoms per unit cell with a lattice constant $a_0 =$ to $4.880 \pm 0.001$Å from which the density is calculated to be $\rho =$ to 14.32 g./cc.

In accordance with a further modification the uranium hydride may be decomposed and then reacted with nitrogen or ammonia. Where the uranium hydride has decomposed into uranium metal and hydrogen, the metal has a fine particle size with the major portion being between 300 mesh and 450 mesh. Such uranium metal, by reason of its finely divided state and its purity, is in a highly reactive form thereby causing the reaction between the uranium and ammonia or nitrogen to proceed rapidly and completely. Massive or bulky uranium may be broken up by reaction with hydrogen and the hydride decomposed to metal and subjected to the action of ammonia or nitrogen. In such a case the formation of a nitride coating on the metal which normally tends to occur and to stop the reaction is minimized and substantially complete reaction occurs.

It has been found that the rate of reaction of the uranium with ammonia increases with the temperature up to 250° C. as shown by the following table which indicates the weight increase of the uranium in milligrams per hour for uranium hydride prepared from 9.35 grams of uranium metal:

*Table*

| Temperature | Weight Increase |
|---|---|
|  | Mg. |
| 100° C | 1.5 |
| 150° C | 6.0 |
| 200° C | 8.3 |
| 235° C | 82.0 |
| 250° C | 316.0 |

At 250° C., the reaction was complete in two hours and fifteen minutes with the gain in weight being approximately 550 mg.

This application is a continuation-in-part of our copending application, now Patent No. 2,534,676, December 19, 1950, which copending application is directed to the reaction of uranium hydride with a compound of a nonmetal and hydrogen.

The above detailed description is given for purposes of illustration and the invention is to be limited only by the scope of the appended claims.

What is claimed is:

1. A process of obtaining a uranium nitride which comprises reacting a member of the group consisting of ammonia and nitrogen with uranium hydride at a temperature of between 200° C. and 400° C. and thereafter calcining the uranium nitride thus obtained at a temperature substantially above 400° C. to secure a uranium nitride having a lower nitrogen content than the uranium nitride originally produced.

2. A process of obtaining a uranium nitride which comprises reacting ammonia with uranium hydride at a temperature of between about 200° C. and 350° C. and thereafter calcining the uranium nitride thus obtained at a temperature of about 1400° C. to secure a uranium nitride having a lower nitrogen content than the uranium nitride originally produced.

AMOS S. NEWTON.
OLIVER JOHNSON.

REFERENCES CITED

The following references are of record in the file of this patent:

UNITED STATES PATENTS

| Number | Name | Date |
|---|---|---|
| 1,835,024 | Driggs | Dec. 8, 1931 |

OTHER REFERENCES

Mellor: Inorganic Chemistry, volume 8, pages 97 and 130.

Moissan, Comptes Rendus, volume 122, page 1092 (1896). (Copy in Scientific Library.)

Maxted, Ammonia and the Nitrides, page 50, published in 1921, by J. & A. Churchill, London. (Copy in Scientific Library, TP223.M3.)